United States Patent [19]
Tanaka et al.

[11] Patent Number: 5,359,644
[45] Date of Patent: Oct. 25, 1994

[54] VOICE/IMAGE SIMULTANEOUS COMMUNICATION APPARATUS

[75] Inventors: Toru Tanaka, Fujisawa; Toyota Honda, Yokohama; Teiji Okamoto, Fujisawa; Seiji Tanaka, Katsuta, all of Japan

[73] Assignee: Hitachi Ltd., Tokyo, Japan

[21] Appl. No.: 200,521

[22] Filed: Feb. 23, 1994

[30] Foreign Application Priority Data

Mar. 2, 1993 [JP] Japan .................. 5-040942

[51] Int. Cl.$^5$ .......................... H04M 11/00
[52] U.S. Cl. ...................... 379/96; 379/100; 379/58; 348/17; 358/435
[58] Field of Search ............. 379/90, 93, 96–100, 379/58; 348/14, 17–19; 358/400, 401, 434, 435, 438, 439, 442, 469; 375/8, 121

[56] References Cited

U.S. PATENT DOCUMENTS

| | | | |
|---|---|---|---|
| 4,849,811 | 7/1989 | Kleinerman | 379/98 |
| 4,887,158 | 12/1989 | Guichard et al. | 348/17 |
| 5,164,980 | 11/1992 | Bush et al. | 348/17 |
| 5,204,893 | 4/1993 | Choi et al. | 348/17 |

FOREIGN PATENT DOCUMENTS

| | | | |
|---|---|---|---|
| 0390170 | 10/1990 | European Pat. Off. | 379/53 |
| 2173675 | 10/1986 | United Kingdom | 379/53 |

Primary Examiner—Wing F. Chan
Attorney, Agent, or Firm—Antonelli, Terry, Stout & Kraus

[57] ABSTRACT

A voice/image simultaneous communication apparatus which can transmit image data while permitting talking with higher efficiency by encoding voice and synthesizing voice coded data and image data than by multiplexing frequencies. The voice/image simultaneous communication apparatus is constructed of a voice coder for coding an analog voice signal, a voice decoder for decoding the coded voice into an analog voice signal, a data synthesizer for synthesizing image coded data and voice coded data, a data separator for separating synthesized coded data into image coded data and voice coded data, and a modem capable of performing full duplex communication. The data synthesizer can change the ratio of synthesis between voice coded data and image coded data in accordance with the data transmission speed.

10 Claims, 10 Drawing Sheets

VOICE/IMAGE SIMULTANEOUS COMMUNICATION APPARATUS

BACKGROUND OF THE INVENTION

The present invention relates to a system for transmitting a voice simultaneously with image data and more particularly to a voice/image simultaneous communication apparatus which performs communication by converting a voice into digital data.

As a technique of transmitting a plurality of pieces of information by using the telephone line, a technique of transmitting a voice simultaneously with other information signals by securing less deterioration in voice quality is introduced in JP-B 55-28616.

In this prior art, information signals are transmitted within a central band portion having a flat characteristic in a telephone transmission band of from 0.3 kHz to 3.4 kHz and therefore, the quality of information signals can be maintained and in addition low frequency components and high frequency components of a voice can serve to lessen deterioration in voice quality.

However, in an application to, for example, facsimile wherein a modulation signal having a modulation band which occupies most of the transmission band of telephone line is transmitted as an information signal, the frequency-multiplexed simultaneous transmission of a voice signal and an information signal as in the aforementioned prior art is difficult to achieve.

SUMMARY OF THE INVENTION

The present invention intends to solve the above prior art problems and it is an object of the invention to provide a voice/image simultaneous communication apparatus which can transmit an information signal such as a facsimile and a voice signal simultaneously.

The above object can be accomplished by a voice-/image simultaneous communication apparatus comprising image input means, image coder means, image decoder means, image output means, voice input/output means, voice coder means, voice decoder means, data synthesizer means, data separator means, data modem means, circuit connecting means and system controller means.

Image data read by the image input means is compressively coded by the image coder means and inputted to the data synthesizer means. An analog voice signal inputted through the voice input/output means is compressively coded by the voice coder means and applied to the data synthesizer means. The data synthesizer means synthesizes image coded data and voice coded data through a predetermined method and delivers resulting data to the data modem means. The data modem means modulates the synthesized coded data into an analog signal and transmits it to a telephone line through the circuit connecting means.

On the other hand, a signal received from the telephone line is applied to the data modem means through the circuit connecting means and demodulated into coded data. Demodulated coded data is applied to the data separator means so as to be separated into image coded data and voice coded data, of which the image coded data is delivered to the image decoder means and the voice coded data is delivered to the voice decoder means. The image decoder means decodes compressed image coded data into image data and delivers it to the image output means. The voice decoder means decodes voice coded data into an analog voice signal and delivers it to the voice input/output means.

Talking detecting means detects whether the voice input/output means and the like are in operation and delivers a detection signal to the system controller means. When receiving a detection signal indicative of an end of operation, the system controller means checks whether image data is in transmission and if the image data is in transmission, it controls the circuit connecting means such that the circuit will not be disconnected.

DESCRIPTION OF THE PREFERRED EMBODIMENTS

As a first embodiment of a voice/image simultaneous communication apparatus according to the present invention, a voice/facsimile simultaneous communication apparatus will be described hereunder. The voice/facsimile simultaneous communication apparatus of the present embodiment can perform full duplex communication of an image of facsimile through one analog telephone line while permitting talking and in addition can ensure normal communication with even a communication partner using a facsimile apparatus pursuant to the G3 standards of CCITT recommendation or an ordinary telephone set.

Figure 1:
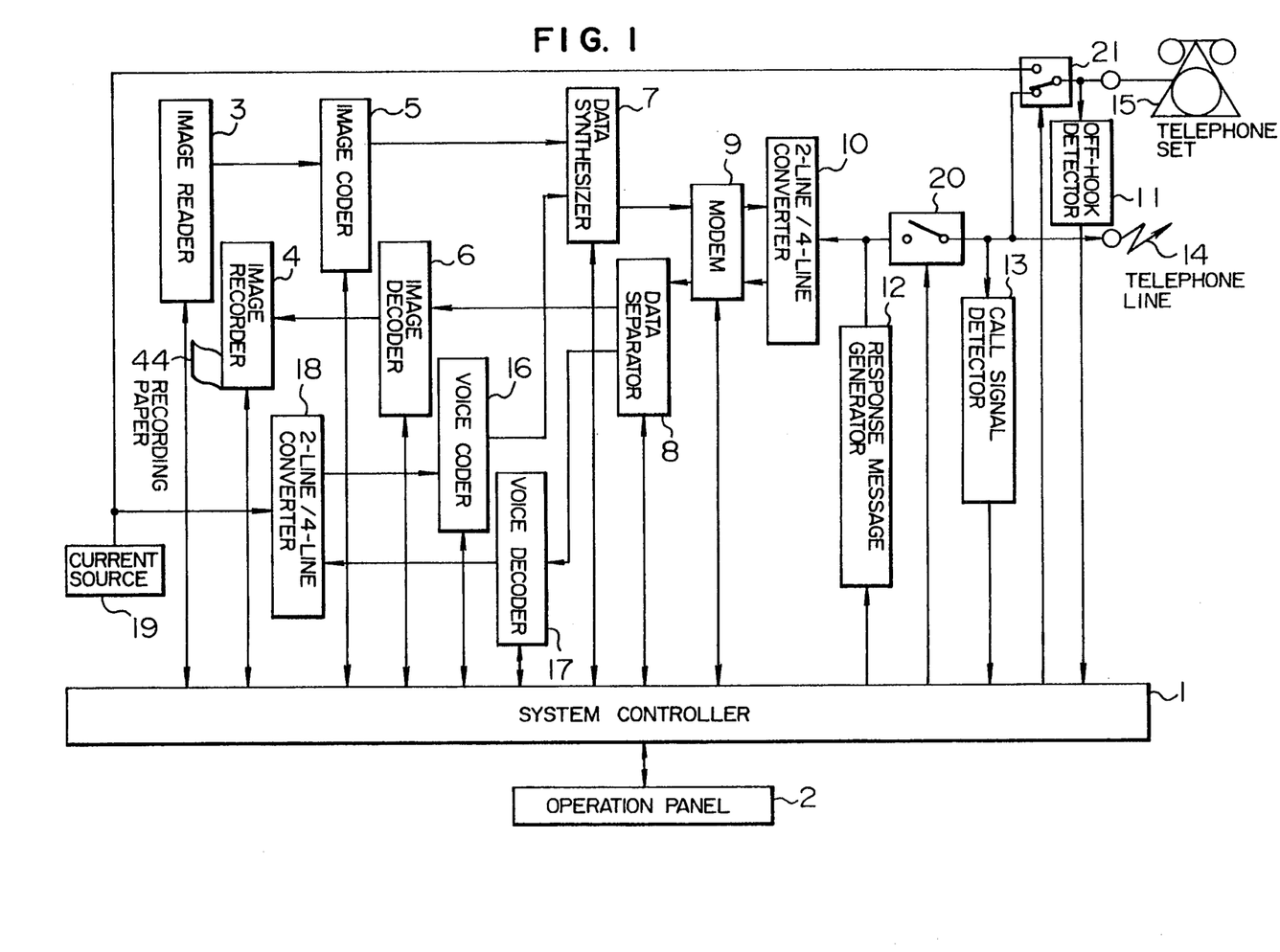
FIG. 1 is a block diagram showing the construction of a voice/facsimile simultaneous communication apparatus according to a first embodiment of the invention.

FIG. 1 is a block diagram showing the construction of the first embodiment of the voice/facsimile simultaneous communication apparatus according to the present invention. In FIG. 1, reference numeral designates a system controller, 2 an operation panel, 3 an image reader, 4 an image recorder, 5 an image coder, 6 an image decoder, 7 a data synthesizer, 8 a data separator, 9 a modem, 10 a 2-line/4-line converter, 11 an off-hook detector, 12 a response message generator, 13 a call signal detector, 14 a telephone line, 15 a telephone set, 16 a voice coder, 17 a voice decoder, 18 a 2-line/4-line converter, 19 a current source, 20 a switch, and 21 a switch. Firstly, individual units will be described in greater detail.

Figure 2:
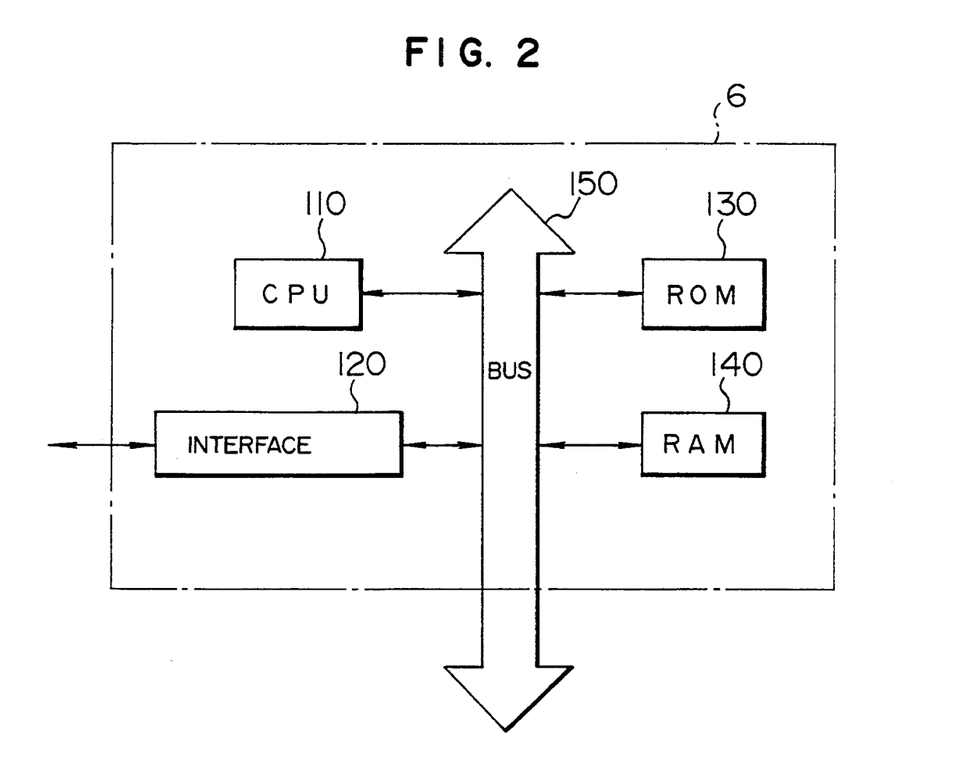
FIG. 2 is a block diagram showing the construction of a system controller in FIG. 1.

The system controller 1 of FIG. 1 includes as shown in FIG. 2 a CPU 110, an interface 120, a ROM 130, a RAM 140 and a bus 150. The CPU 110 is operated by software stored in the ROM 130 to control individual units of the voice/facsimile simultaneous communication apparatus according to the present embodiment through the interface 120 or bus 150.

Figure 3:
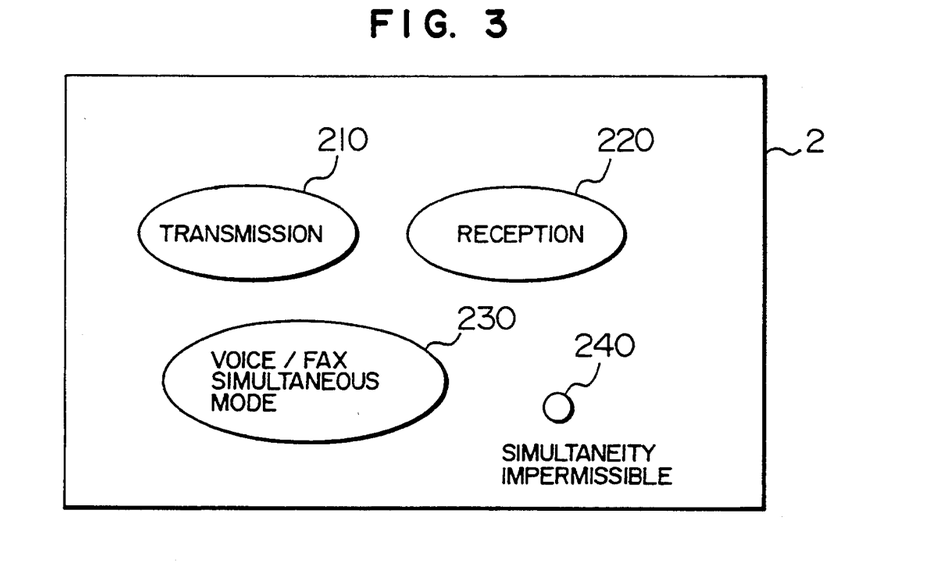
FIG. 3 is a diagram showing the external, construction of an operation panel in FIG. 1.

The operation panel 2 of FIG. 1 has as shown in FIG. 3 a transmission button 210, a reception button 220, a voice/FAX simultaneous mode button 230 and a simultaneity impermissible LED 240 and these buttons are connected to the system controller 1.

The image reader 3 of FIG. 1 responds to a command from the system controller 1 to read a transmitting manuscript and converts read image data into a binary signal which in turn is delivered to the image coder 5 of FIG. 1.

The image recorder 4 of FIG. 1 records binary image data delivered out of the image decoder 6 of FIG. 1 on a recording paper.

The image coder 5 of FIG. 1 codes the binary image data delivered out of the image reader 3 in accordance with the G3 standards of CCITT recommendation and delivers it to the data synthesizer 7.

The image decoder 6 decodes image coded data delivered out of the data separator 8 into binary image data and delivers it to the image recorder 4. The decoding scheme is the same as that of a transmission partner.

An image storage may be interposed between the image decoder 6 and the image recorder 4 so that image data decoded by the image decoder 6 may be once stored and the stored image data may be delivered to the image recorder 4.

The data synthesizer 7 of FIG. 1 synthesizes two pieces of coded data delivered out of the image coder 5 and voice coder 16 and delivers synthesized data to the modem. A method of data synthesis will be described in detail with reference to FIG. 4.

Figure 4:
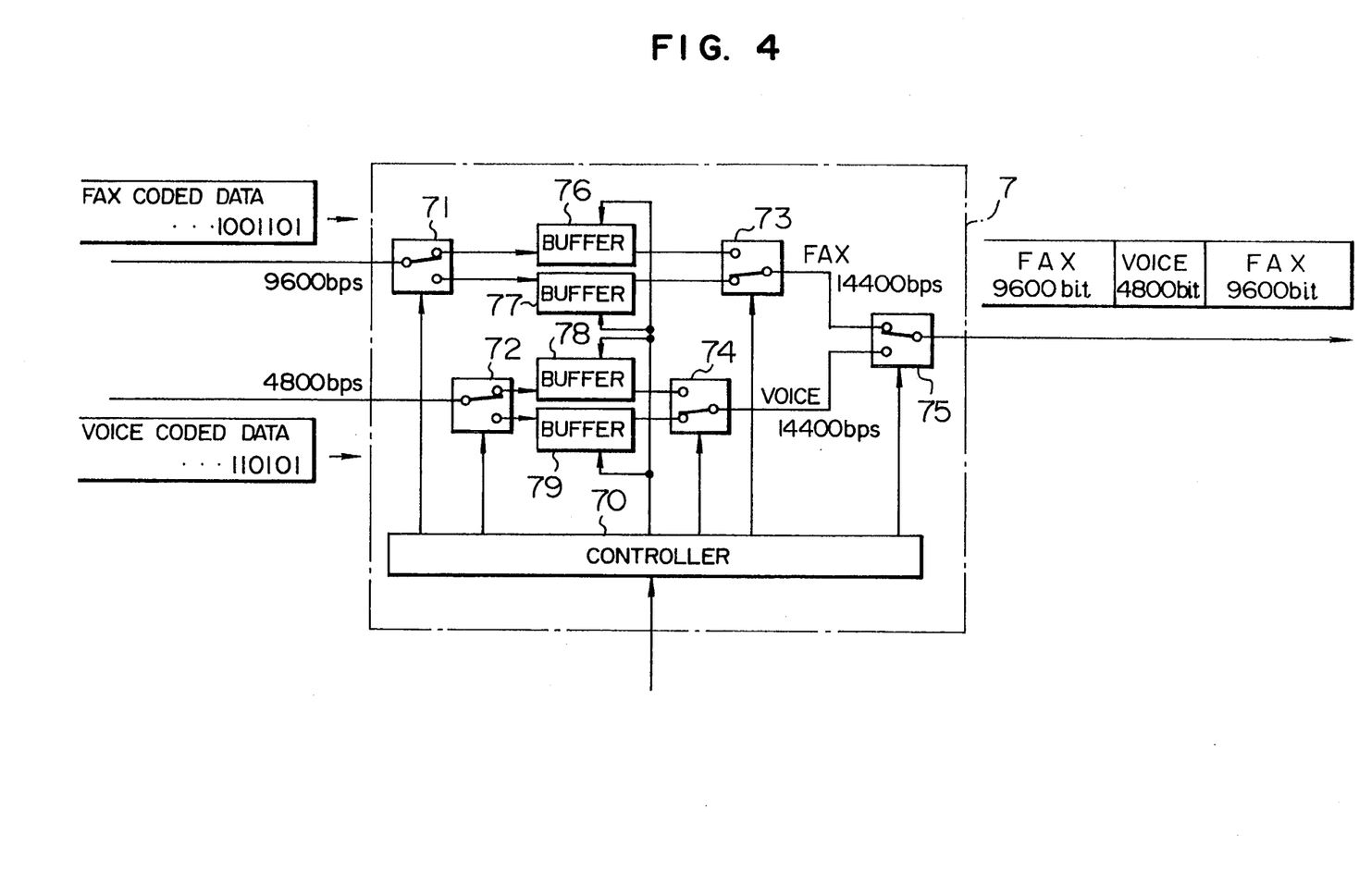
FIG. 4 is a block diagram showing the construction of a data synthesizer in FIG. 1.

FIG. 4 is a block diagram showing the construction of the data synthesizer 7 and depicts switches 71, 72, 73, 74 and 75, buffers 76, 77, 78 and 79 and a controller 70. The controller 70 is operated by a command of the system controller 1 to control switching of the respective switches and read/write of coded data of FAX and coded data of voice to and from the respective buffers and synthesize the data pieces on time division base. FIG. 4 shows the operation when the data transmission speeds are 9600 bps and 4800 bps for coded data of FAX and coded data of voice, respectively, and the data transmission speed is 14400 bps for synthesized data.

The controller 70 first transfers the switch 71 to the buffer 76 and so 9600 bits of coded data of facsimile inputted at the 9600 bps data transmission speed are written into the buffer 76 and after completion of write into the buffer 76, the controller transfers the switch 71 to the buffer 77, so that 9600 bits of coded data of facsimile are now written into the buffer 77. Subsequently, the above operations are repeated alternately.

Concurrently with the above operations, the controller 70 transfers the switch 72 to the buffer 78 and so 4800 bits of coded data of voice inputted at the 4800 bps data transmission speed are written into the buffer 78 and after completion of write into the buffer 78, the controller transfers the switch 72 to the buffer 79, so that 4800 bits of coded data of voice are now written into the buffer 79. Subsequently, the above operations are repeated alternately.

When write of 9600 bits of coded data of facsimile into the buffer 76 is now completed, the controller 70 transfers the switch 73 to the buffer 76 and the switch 75 to the switch 73 and so 9600 bits of coded data of facsimile stored in the buffer 76 are read at the 14400 bsp data transmission speed. As the data pieces in the buffer 76 are all read out, the controller now transfers the switch 75 to the switch 74 and the switch 74 to the buffer 78, so that 4800 bits of coded data of voice stored in the buffer 78 are read out at the 14400 bps data transmission speed.

As the data pieces in the buffer 78 are all read out, the switch 75 is again transferred to the switch 73 and the switch 73 is transferred to the buffer 77, so that 9600 bits of coded data of facsimile written in the buffer 77 are read at the 14400 bps data transmission speed. Upon completion of read-out of all of the data pieces in the buffer 77, the switch 75 is again transferred to the switch 74 and the switch 74 is transferred to the buffer 79 and so 4800 bits of coded data of voice written in the buffer 79 are read at the 14400 bps data transmission speed.

Upon completion of read-out of all of the data pieces in the buffer 79, the switch 75 is again transferred to the switch 73 and the switch 73 is transferred to the buffer 76, so that 9600 bits of coded data of facsimile written in the buffer 76 are read at the 14400 bps data transmission speed. Subsequently, the above operation is repeated in a similar manner until the system controller 1 delivers an end command.

The data synthesizer 7 also has a facsimile mode wherein responsive to a command of the system controller 1, the switch 71 is transferred to the buffer 76, the switch 73 to the buffer 76 and the switch 75 to the switch 73 in order that inputted coded data of FAX is passed through the buffer 76 to the switch 75 and is delivered as it is from the switch 75. This facsimile mode is used when ordinary facsimile communication is carried out.

The data separator 8 of FIG. 1 separates coded data demodulated by the modem 9 into image coded data and voice coded data and delivers the image coded data to the image decoder 6 and the voice coded data to the voice decoder 17. A method for separation of data will now be detailed with reference to FIG. 5.

Figure 5:
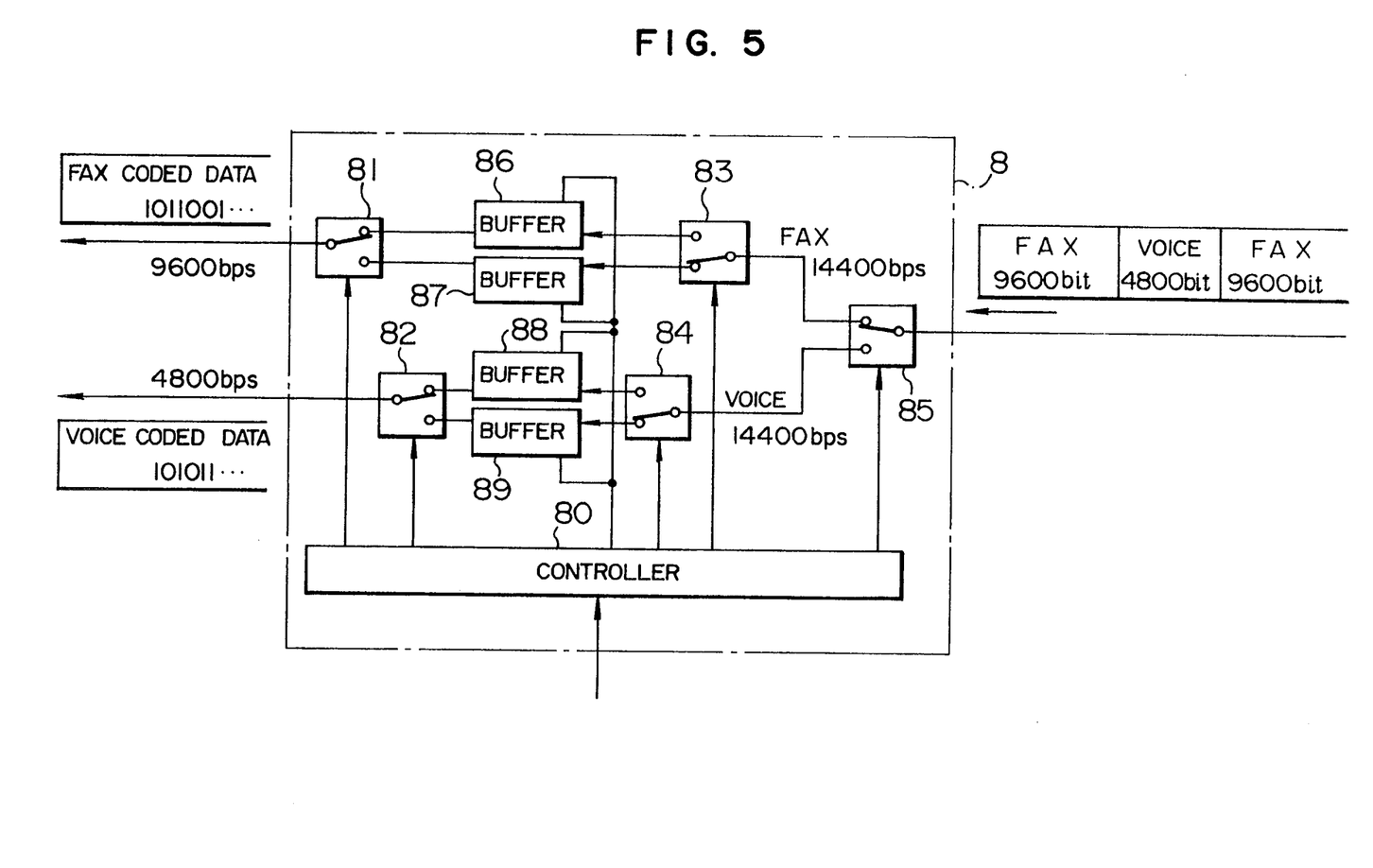
FIG. 5 is a block diagram showing the construction of a data separator in FIG. 1.

FIG. 5 is a block diagram showing the construction of the data separator 8 and depicts switches 81, 82, 83, 84 and 85, buffers 86, 87, 88 and 89 and a controller 80. The controller 80 is operated by a command of the system controller 1 to control switching of the respective switches in order to separate coded data synthesized on time division base into coded data of FAX and coded data of voice. In FIG. 5, an operation is shown in which coded data of 14400 bps synthesized on time division base is received, and coded data of FAX is delivered at a data transmission speed of 9600 bps and coded data of voice is delivered at a data transmission speed of 4800 bps.

The controller 80 first transfers the switch 85 to the switch 83 and the switch 83 to the buffer 86 and so 9600 bits of coded data of FAX inputted at the 14400 bps data transmission speed are written into the buffer 86. After completion of write into the buffer 86, the controller transfers the switch 85 to the switch 84 and the switch 84 to the buffer 88, so that 4800 bits of coded data of voice inputted at the 14400 bps data transmission speed are written into the buffer 88.

Upon completion of write into the buffer 88, the switch 85 is transferred to the switch 83 and the switch 83 is transferred to the buffer 87, so that 9600 bits of coded data of FAX inputted at the 14400 bps data transmission speed are written into the buffer 87. Upon completion of write into the buffer 87, the switch 85 is transferred to the switch 84 and the switch 84 is transferred to the switch 89 and so 4800 bits of coded data of voice inputted at the 14400 bps data transmission speed are written into the buffer 89. After completion of write into the buffer 89, write into the buffer 86 is again started and subsequently a similar operation is repeated.

Concurrently with this operation, the controller 80 commands data read from one of the buffers 86, 87, 88 and 89 which has completed data write. For example, as write of 9600 bits of coded data of facsimile into the buffer 86 is completed, the switch 81 is transferred to the buffer 86 and so the 9600 bits of coded data of facsimile are read at the 9600 bps data transmission speed. Upon completion of read, the switch 81 is transferred to the buffer 87 to read coded data of facsimile. Subsequently, similar operations are repeated alternately.

On the other hand, when write of 4800 bits of coded data of voice into the buffer 88 is completed, the switch 82 is transferred to the buffer 88 and so 4800 bits of coded data of voice are read at the 4800 bps data transmission speed. Upon completion of read, the switch 82 is transferred to the buffer 89 to read coded data of voice. Subsequently, similar operations are repeated alternately.

The data separator 8 also has a facsimile mode wherein responsive to a command of the system controller 1, the switch 85 is transferred to the switch 83, the switch 83 to the buffer 86 and the switch 81 to the buffer 86 in order that received coded data is passed through the buffer 86 to the switch 81 and is delivered as it is from the switch 81. This mode is used when ordinary facsimile communication is carried out.

An image storage may be interposed between the data separator 8 and the image decoder 6 so that image coded data delivered out of the data separator 8 may be stored and the stored image coded data is delivered to the image decoder 6.

When any facsimile is not transmitted, that is, when any coded data of facsimile is not received from the image coder 5, dummy read is carried out by using the contents of the buffer as dummy data.

In the present embodiment, coded data of facsimile and coded data of voice are synchronized on time division base so as to be synthesized with each other or separated from each other but alternatively each coded data may be added with a flag indicating which data this data is.

Figure 6:
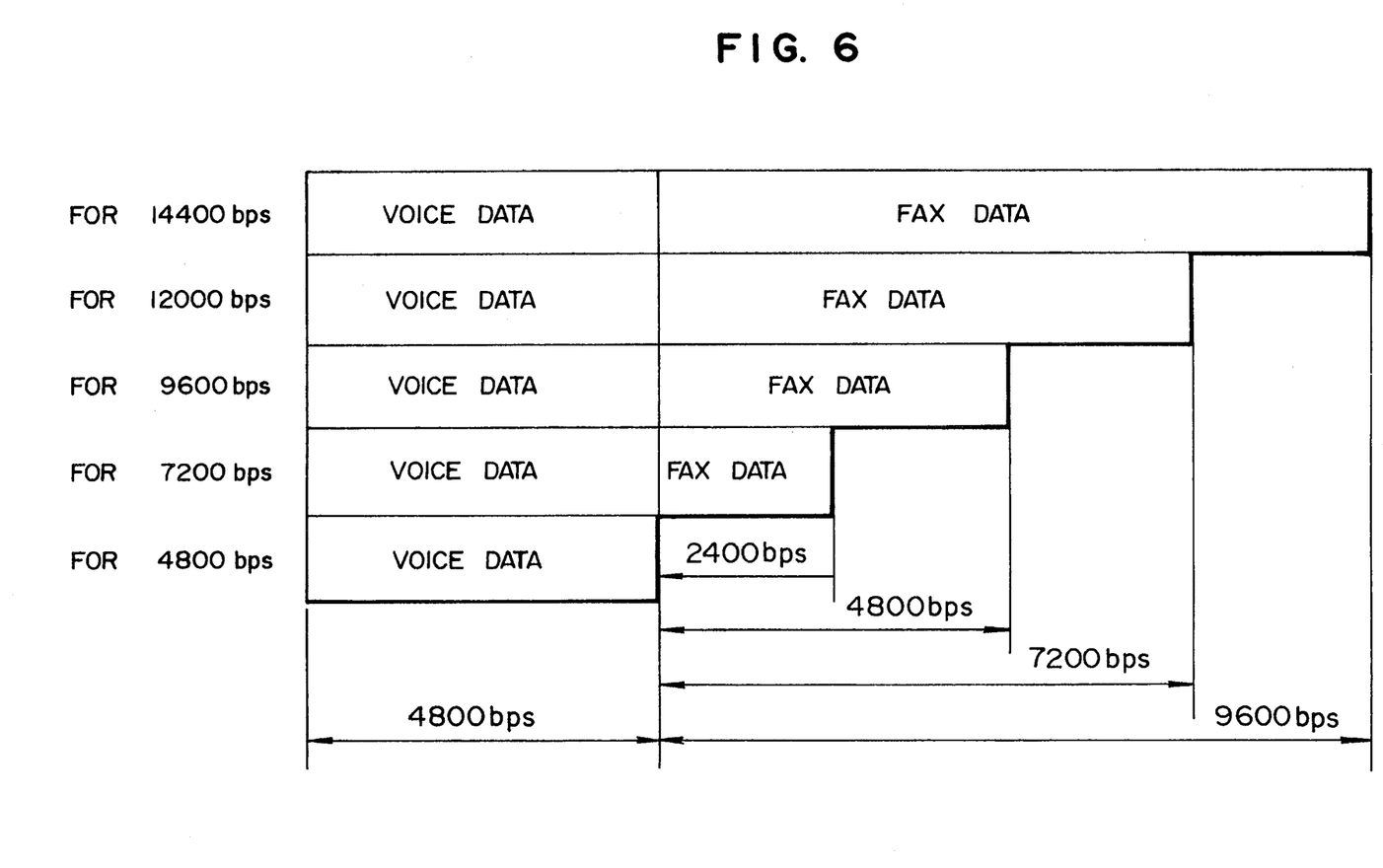
FIG. 6 is a diagram for explaining the structure of transmission/reception data in the present invention.

The data synthesizer 7 and the data separator 8 are described on the assumption that the coded data of facsimile is transmitted at a speed of 9600 bps and the coded data of voice is transmitted at a speed of 4800 bps but the data transmission speeds may be of different values. In the present embodiment, as shown in FIG. 6, the transmission speed of facsimile data changes with the data transmission speed of the modem 9 and the transmission speed of voice data is fixed to 4800 bps. The system controller 1 controls the data synthesizer 7 and data separator 8 such that, as shown in FIG. 6, the facsimile data transmission speed is 9600 bps when the data transmission speed of the modem 9 is 14400 bps, is 7200 bps when 12000 bps, is 4800 bps when 9600 bps, is 2400 bps when 7200 bps, and only coded data of voice is available when 4800 bps.

Figure 7:
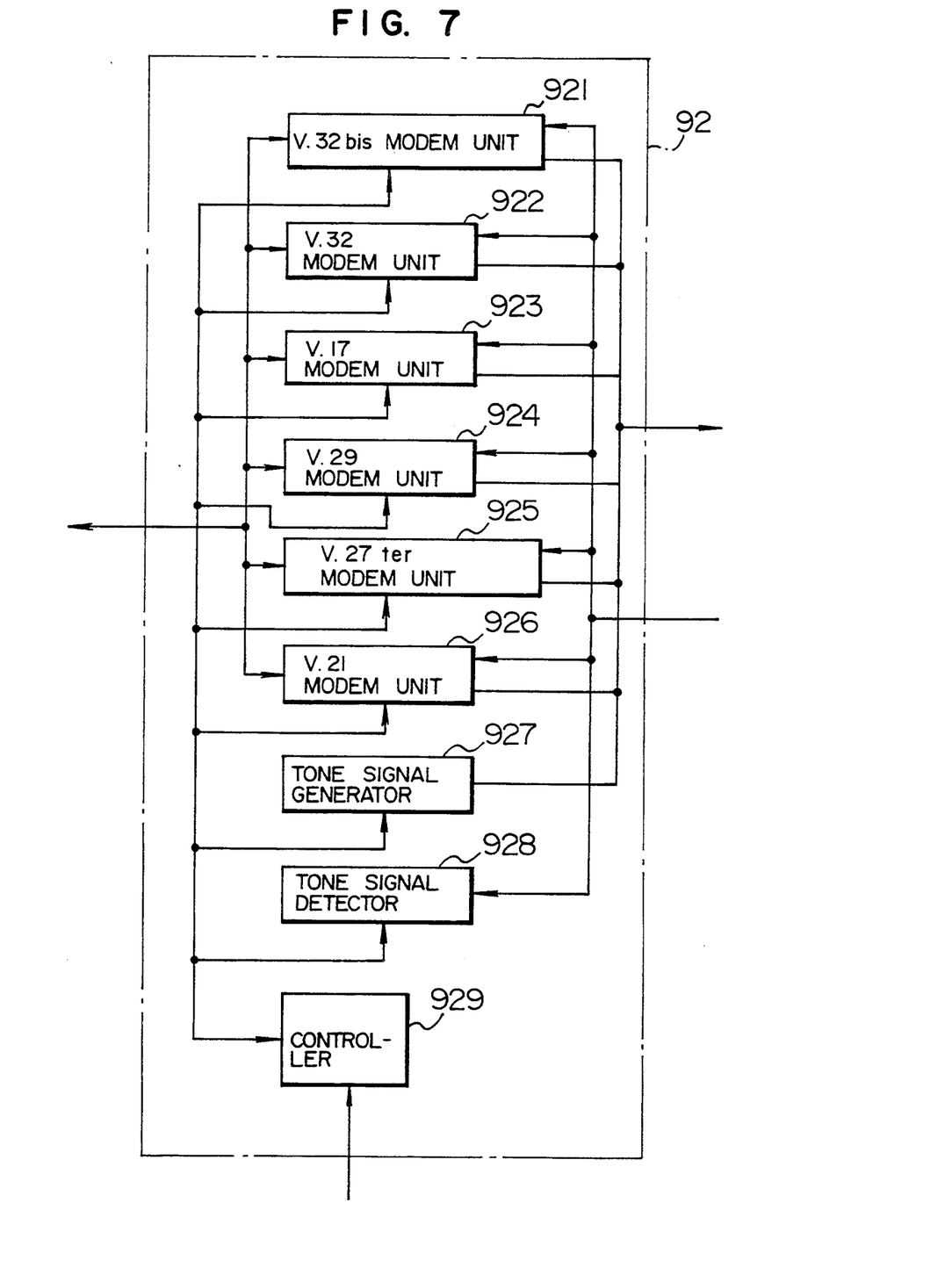
FIG. 7 is a block diagram showing the construction of a modem in FIG. 1.

The modem 9 of FIG. 1 is constructed as shown in FIG. 7. In the Figure, reference numeral 921 designates a V.32bis modem unit, 922 a V.32 modem unit, 923 a V.17 modem unit, 924 a V.29 modem unit, 925 a V.27ter modem unit, 926 a V.21 modem unit, 927 a tone signal generator, 928 a tone signal detector and 929 a controller. The V.32bis, V.32, V.17, V.29, V.27ter and V.21 are names of the standards concerning modem schemes of CCITT recommendation.

In FIG. 7, the controller 929 communicates with the system controller 1 to perform input/output of control data for changing over the modem schemes of V.32bis, V.32, V.17, V.29, V.27ter and V.21 of CCITT recommendation. These modem schemes use a data transmission speed of any one of 14400 bps, 12000 bps, 9600 bps, 7200 bps, 4800 bps, 2400 bps and 300 bps and in particular, the full duplex operation is permitted for V.32 and V.32bis. In simultaneous communication carried out with the voice/facsimile simultaneous communication apparatus of the present embodiment, the modem schemes of V.32bis and V.32 are used to ensure simultaneous communication as shown in FIG. 8.

Figure 8:
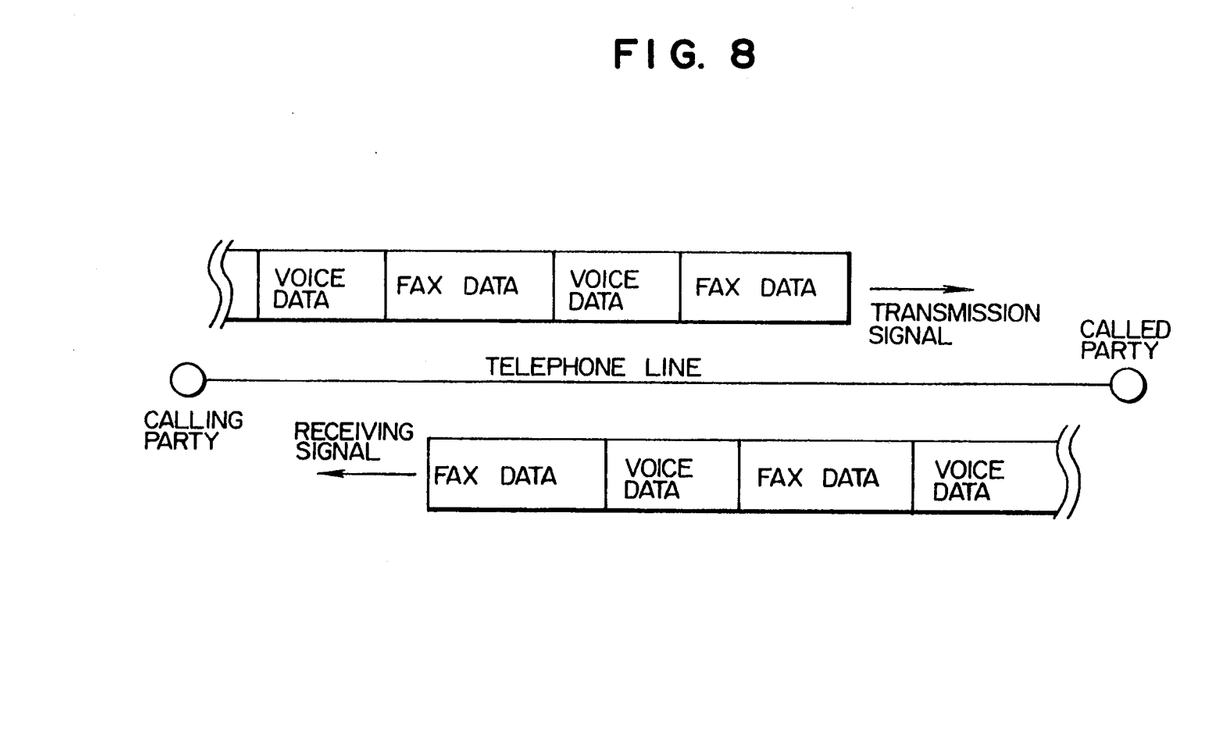
FIG. 8 is a diagram for explaining the format of signals appearing during voice/facsimile simultaneous communication in FIG. 1.

In FIG. 8, when a transmission signal composed of FAX data and voice data time-division multiplexed by the data synthesizer 7 is transmitted from a calling party to a called party, a receiving signal of similar format from the called party is concurrently received. The tone signal generator 927 can generate a tone signal of a desired frequency and in particular, can generate a CNG signal (an intermittent sound of 1100 Hz) of facsimile under the control of the system controller 1. The tone signal detector 928 can detect a frequency designated by the system controller 1 through the controller 929. When detecting the frequency, the tone signal detector informs the system controller 1 of that detection through the controller 929 and therefore the CNG signal and a busy sound (an intermittent sound of 400 Hz) can be detected under the control of the system controller 1.

The 2-line/4-line converter 10 of FIG. 1 outputs a modulation signal, delivered out of the modem 9, to the telephone line 14 through the switch 20 or a modulation signal, received from the telephone line 14, to the modem 9.

The response message generator 12 of FIG. 1 is constructed of a ROM and an IC dedicated to voice reproduction and it responds to a command of the system controller 1 to reproduce a voice which in turn is delivered to the telephone line 14 through the switch 20. This voice message is a response message having the contents which reads "I am out just now. Please call me later. If you send facsimile, please push the transmission button after a beep."

The off-hook detector 11 of FIG. 1 detects on-hook/off-hook of the telephone set 15 and informs the system controller 1 of a detection result.

The call signal detector 13 of FIG. 1 monitors a call signal on the telephone line 14 and when detecting a call signal, informs the system controller 1 of that detection of the call signal.

The voice coder 16 of FIG. 1 A/D converts an analog voice signal, delivered out of the 2-line/4-line converter 18, into digital data and thereafter codes the digital data to provide coded data of voice which in turn is delivered to the data synthesizer 7. Used as a voice coding scheme in the present embodiment is an ADPCM scheme in which the sampling frequency is 2400 Hz and the quantizing bit number is 2 bits. Accordingly, the data transmission speed of voice coded data is 4800 bps. Other voice coding schemes such as PCM and DPCM may suffice and it is not always necessary that the transmission speed of voice coded data be 4800 bps.

The voice decoder 17 of FIG. 1 decodes voice coded data inputted from the data separator 8 at the 4800 bps data transmission speed by using the same ADPCM scheme as that used for coding to provide a converted analog voice signal which in turn is delivered to the 2-line/4-line converter 18.

When the switch 21 is transferred to the 2-line/4-line converter 18, the 2-line/4-line converter 18 of FIG. 1 outputs, through the switch 21, a voice signal delivered out of the voice decoder 17 to the telephone set 15 or outputs a voice signal inputted from the telephone set 15 through the switch 21 to the voice coder 16.

The current source 19 of FIG. 1 is adapted to supply a current to the telephone set 15 through the same signal path as that for the aforementioned voice signal when the switch 21 is transferred to the 2-line/4-line converter 18, thereby permitting the telephone set 15 to operate normally even when the telephone set 15 is connected to the 2-line/4-line converter 18.

The switch 21 of FIG. 1 switches over to determine whether or not voice/facsimile simultaneous communication is carried out and it is initially connected to the telephone line 14.

The operation carried out when one voice/facsimile simultaneous communication apparatus of the present embodiment communicates with another apparatus of the present embodiment will now be described with reference to FIG. 9. It is assumed herein that a party which depresses the voice/FAX simultaneous mode button 230 of operation panel 2 earlier is called a master party and the communication partner is called a slave party.

Figure 9:
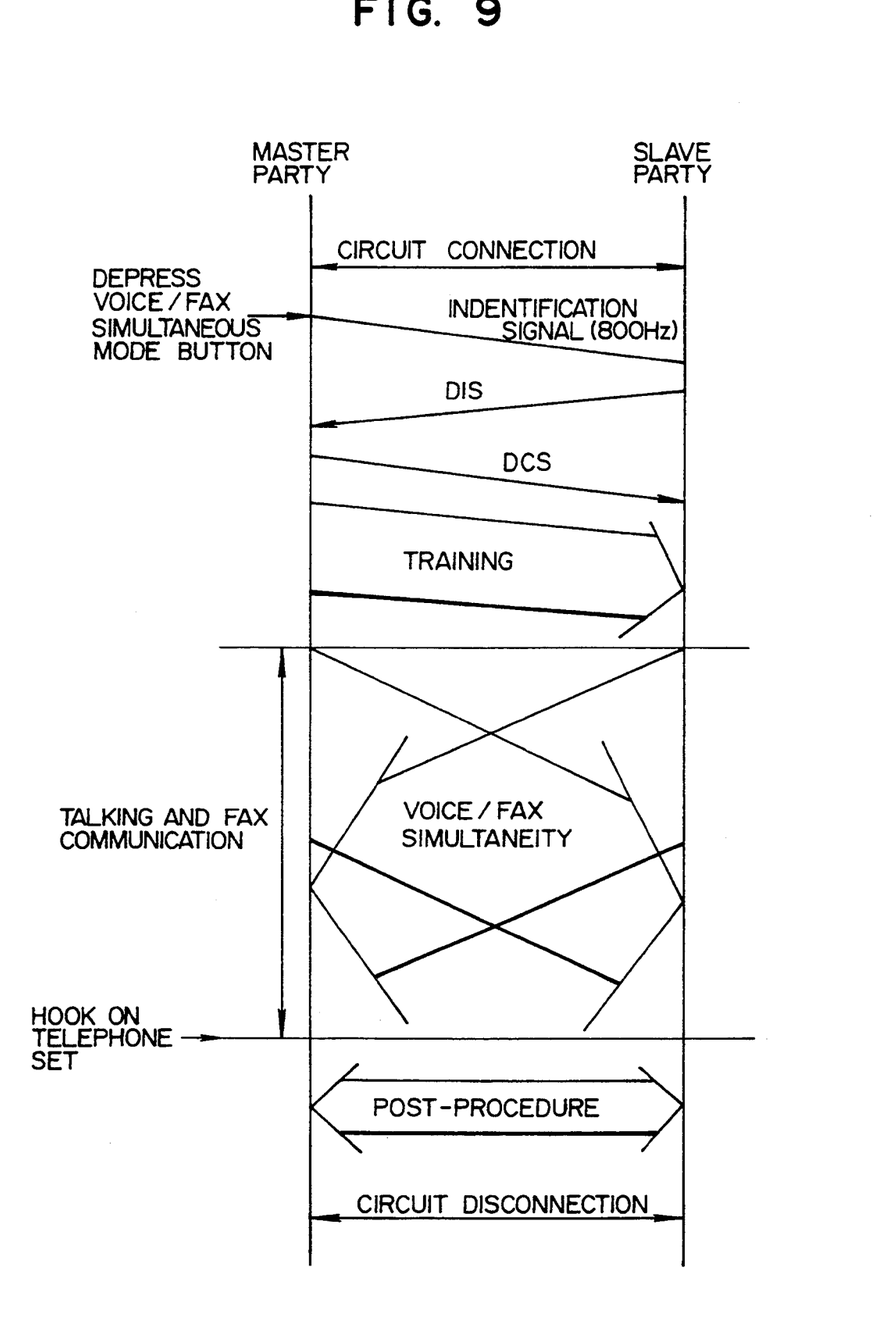
FIG. 9 is a diagram for explaining the operation of voice/facsimile simultaneous communication in FIG. 1.

Referring now to FIG. 9, the master party depresses the voice/FAX simultaneous mode button 230 of operation panel 2 under a state of circuit connection to transmit an identification signal of a tone signal of 800 Hz. This identification signal is of the same structure as that of a CNG signal of the facsimile standards of CCITT recommendation with the only exception that the frequency is 800 Hz. The slave party detecting the identification signal returns a DIS signal (indicative of functional information possessed by a signal using V.21 channel 2 of CCITT recommendation) as in ordinary facsimile. The master party receiving the DIS signal returns a DCS signal (indicative of functional information selected by the signal using V.21 channel 2 of CCITT recommendation).

This functional information indicates, in ordinary facsimile, a corresponding data transmission speed, a coding scheme and resolution and even in the voice/facsimile simultaneous communication apparatus of the present embodiment, it has the same structure as that employed in the ordinary facsimile to communicate that the voice/facsimile simultaneous communication apparatus is now in use, the modem scheme of V.32bis or V.32 of CCITT recommendation is used as the modem scheme, the voice coding scheme is the ADPC scheme in which the sampling frequency is 2400 Hz and the quantizing bit number is 2 bits and the image coding scheme of facsimile is the MH coding scheme.

In that case, it is not necessary for the slave party to depress the voice/FAX simultaneous button 230 and the system controller 1 of the slave party recognizes in this procedure that the communication mode is the voice/facsimile simultaneous communication mode. If the slave party standing for a communication partner is not of the voice/facsimile simultaneous communication apparatus, there is no response to the identification signal and therefore the system controller 1 of the master party can recognize that the communication partner is not of the voice/facsimile simultaneous communication apparatus.

After the communication function is determined on the basis of these procedure signals, the master party starts training sequence. In the training sequence adapted to perform, for example, equalization of circuit distortion in the modem 9 and to change the data transmission speed of the modem 9 in accordance with the condition of telephone line , fixed patterns in predetermined sequence of the data transmission speed of modem scheme which begins with a higher one are transmitted to check errors. If many data errors are found, the data transmission speed is slowed down and then the training is restarted.

In other words, if many data errors are found in the training at the 14400 bps transmission speed, the communication speed is slowed down to 12000 bps. If many errors are found even at 12000 bps, the training is carried out at the 9600 bps transmission speed of the modem scheme of the V.32 standards of CCITT recommendation. If many errors are found even at 9600 bps, the transmission speed is again slowed down to 7200 bps.

In the case of the present embodiment, when many data errors are found even at 7200 bps, the system controller 1 in FIG. 1 turns on the simultaneity impermissible LED 240 on the operation panel 2 to inform the user that the voice/facsimile simultaneous communication is impossible. Subsequently, the transmission speed is again slowed down to 4800 bps and if less data errors are found at 4800 bps, communication of voice alone is carried out.

The training is acted by the master party on the slave party and is not acted by the slave party on the master party. Accordingly, a data transmission speed determined by the master party is used also in the slave party to always make the data transmission speed equal for the master and slave parties.

In this manner, a data transmission speed is determined, the communication mode is brought into the voice/facsimile simultaneous communication mode, the ratio between the voice data transmission speed and the facsimile data transmission speed is changed in accordance with the determined communication speed and the voice/facsimile simultaneous communication is carried out. In respect of the data transmission speed, the voice data transmission speed is related to the facsimile data transmission speed as has already been described.

When the talking ends and the telephone set 15 is hooked on in FIG. 1, the off-hook detector 11 detects that the telephone set 15 is hooked on and informs the system controller 1 of this fact. Receiving this information, the system controller 1 uses the modem 9 to perform the post-procedure. The post-procedure will be described later and if an image of facsimile is still in transmission even when the off-hook detector 11 detects on-hook of the telephone set 15, the system controller loperates to prevent the post-procedure until the transmission of the image ends.

The post-procedure will now be described. In the ordinary facsimile, the post-procedure is employed to confirm that transmission and reception of a facsimile image signal ends and disconnect the circuit and it contains an EOP signal indicative of the completion of transmission of all manuscripts, an MCF signal indicative of the fact that reception is normal and a DCN signal which is a circuit interruption instruction. In the voice/facsimile simultaneous communication apparatus, the system controller 1 operates to perform the post-procedure only when both of talking and facsimile end.

The operation conducted when a communication partner is of an ordinary telephone set will now be described. In FIG. 1, the switch 21 is initially connected to the telephone line 14. The telephone set 15 is hooked off to call the communication partner. When the communication partner is on the telephone, the circuit is connected to set up a talking state. Conversely, when a telephone call is received, the bell of the telephone set 15 rings because the telephone set 15 is initially connected to the telephone line 14 and at the time the telephone set 15 is hooked off, the circuit is connected to set up a talking state. In this manner, telephoning can be conducted ordinarily when the communication partner is of a telephone set.

Next, the operation conducted when a communication partner is of an ordinary facsimile apparatus. In the case of reception during talking, the reception button 220 on the operation panel 2 is depressed. Responsive to this depression, the system controller 1 performs facsimile procedure communication by using the V.21 modem unit 926 of the modem 9 and thereafter receives an image signal of facsimile through the modem scheme of V.27ter or V.29 as in the ordinary facsimile. At that time, the data separator 8 is in the aforementioned facsimile mode and outputs image coded data of facsimile delivered out of the modem 9, as it is, to the image decoder 6. Image data decoded by the image. decoder 6 is is sent to the image recorder 4 and printed on a recording paper 44.

In the case of transmission during talking, the transmission button 210 on the operation panel 2 is depressed. Responsive to the depression of the transmission button 210, the system controller 1 transmits a CNG signal by using the tone signal generator 927 of the modem 9 and waits for a facsimile procedure signal from a communication partner. When the procedure communication ends, image data read by the image reader 3 is coded by the image coder 5 and then applied to the data synthesizer 7. At that time, the data synthesizer 7 is in the aforementioned facsimile mode and the image coded data is delivered as it is to the modem 9. The modem 9 modulates the image coded data through one of modem schemes of V.17, V.29 and V.27ter which is determined by the procedure communication as in the ordinary facsimile and resulting data is delivered to the telephone line 14 through the 2-line/4-line converter 10 and switch 20.

Next, the operation of receiving ordinary facsimile when called party is out will be described. When a communication partner calls, the bell of the telephone set 15 rings and concurrently therewith, the call signal detector 13 detects a call signal and informs the system controller 1 of it. When the system controller 1 continues to detect the call signal for a predetermined time, it closes the switch 20 to connect the circuit. If the telephone set 15 is hooked off within this time interval, the detection of the call signal by the system controller is ceased and the switch 20 is not closed thereby, permitting ordinary communication.

After the system controller 1 has closed the switch 20 to connect the circuit, the system controller 1 commands the response message generator 12 to generate a response message. The response message generator 12 delivers a response message of the contents described previously to the telephone line 14 through the switch 20. Thereafter, a facsimile procedure signal is transmitted from the modem 9 and subsequently an operation similar to the ordinary facsimile proceeds.

Thus, in the case of the voice/facsimile simultaneous apparatus wherein a facsimile can be transmitted while a communication partner talks, simultaneous communication can afford to proceed and in the case where a communication partner is of an ordinary telephone set, ordinary talking can afford to proceed. Further, even in the case where a communication partner is of ordinary facsimile, the transmission and reception of facsimile can afford to proceed.

Also, since the transmission speed of voice is not changed but only the transmission speed of facsimile is changed in accordance with the communication speed, simultaneous communication can be carried out while keeping the quality of talking constant.

In addition, even when talking ends earlier and the telephone set is hooked off during simultaneous communication, the circuit will not be disconnected and therefore the user can talk without caring about communication of facsimile.

As a second embodiment of the voice/image simultaneous communication apparatus of the present invention, a voice/image simultaneous communication transceiver will now be described.

Figure 10:
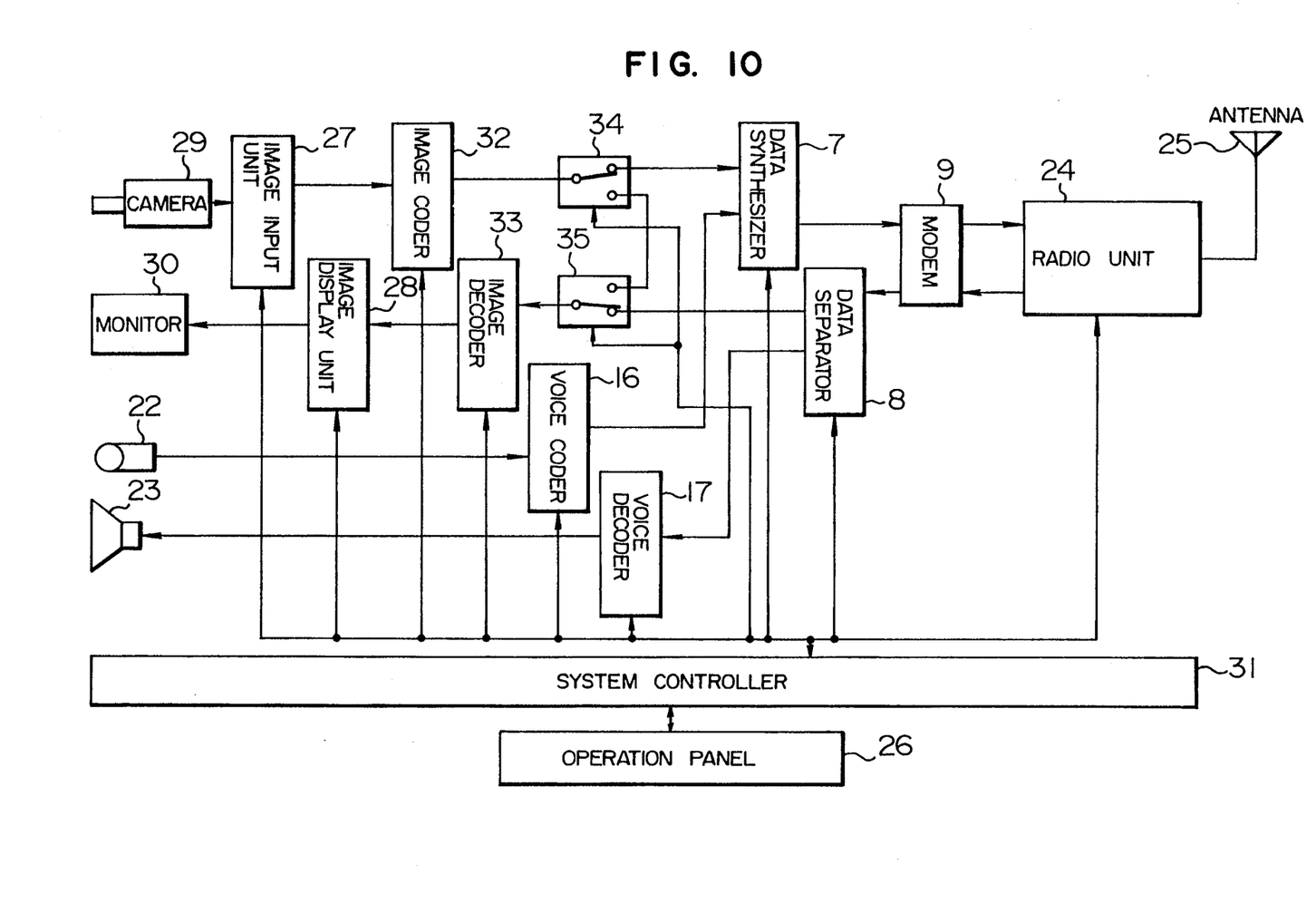
FIG. 10 is a block diagram showing the construction of a voice/image simultaneous communication transceiver according to a second embodiment of the present invention.

FIG. 10 is a block diagram showing the construction of a voice/image simultaneous communication transceiver according to the second embodiment of the present invention. In FIG. 10, reference numeral 22 designates a microphone, 23 a loudspeaker, 24 a radio unit, 25 an antenna, 26 an operation panel, 27 an image input unit, 28 an image display unit, 29 a camera, 30 a monitor, 31 a system controller, 32 an image coder and 33 an image decoder. The other components, i.e., voice coder 16, voice decoder 17, data synthesizer 7, data separator 8 and modem 9 operate similarly to those of the voice/facsimile simultaneous communication apparatus according to the first embodiment and will not be described herein.

Figure 11:
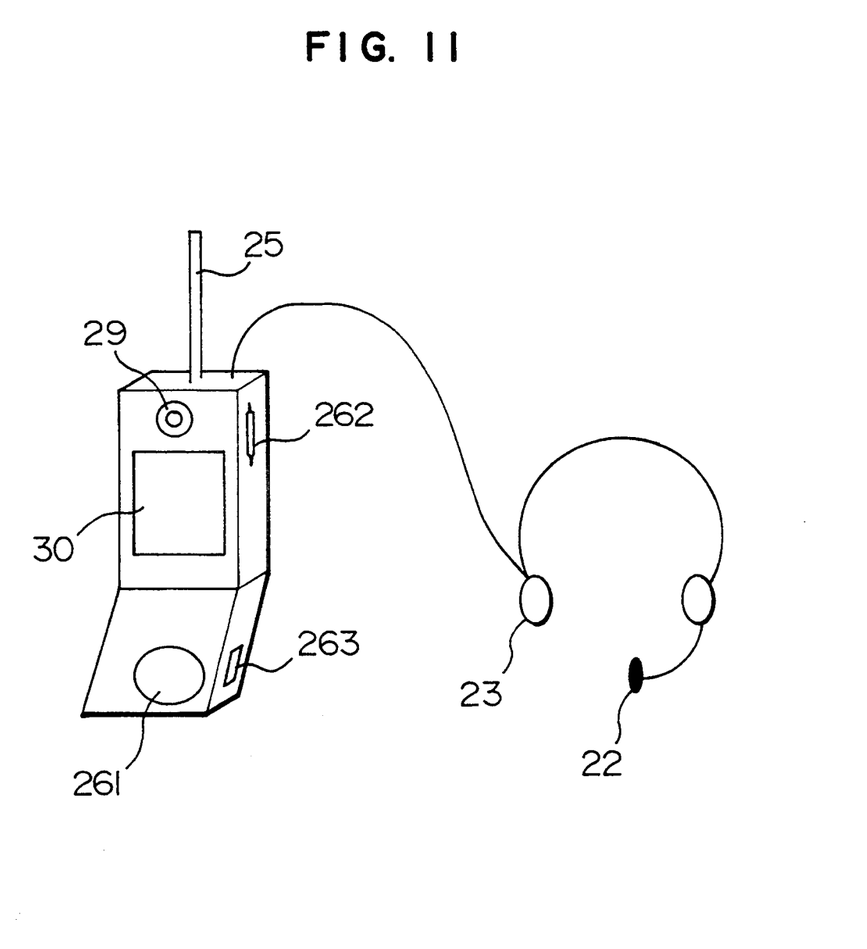
FIG. 11 is a perspective view showing the external appearance of the voice/image simultaneous communication transceiver of FIG. 10.

The operation panel 26 of FIG. 10 has a communication button 261, a confirmation button 262 and a setting switch 263 as shown in FIG. 11. A communication state and a non-communication state are switched alternately each time the communication button 261 is depressed and there is no need of continuing to depress the communication button 261 during communication. To the contrary, it is necessary to continue to depress the confirmation button 262 when an image picked up by the camera 29 is to be confirmed by the monitor 30. In other words, the confirmation function is allowed to operate only while the confirmation button 262 is being depressed. The setting switch 263 is a slide type switch for performing on/off switching mechanically and is used for setting a master apparatus and a slave apparatus.

The system controller 31 of FIG. 10 has the same construction as the system controller 1 of the first embodiment and incorporates software for the voice/image simultaneous communication transceiver.

The voice coder 16 of FIG. 10 codes a voice signal of the microphone 22 through the same ADPCM scheme as that in the first embodiment and delivers a coded signal to the data synthesizer 7.

The voice decoder 17 of FIG. 10 converts voice coded data delivered out of the data separator 8 into an analog voice signal as in the case of the first embodiment and delivers the analog voice signal to the loudspeaker 23.

The image input unit 27 of FIG. 10 converts an analog video signal received from the video camera 29 into digital data which in turn is delivered to the image coder 32.

The image coder 32 of FIG. 10 processes the digital data through DCT conversion, scaler quantization and Huffman coding to provide image coded data which in turn is delivered to the data synthesizer 7. An image coding scheme other than that of the present embodiment may be used.

The image coded data coded by the image coder 32 is synthesized with voice coded data coded by the voice coder 16 by means of the data synthesizer 7, as in the first embodiment, and resulting data is delivered to the modem 9.

The image display unit 28 of FIG. 10 converts image data delivered out of the image decoder 33 into an analog image signal and adds, for example, a synchronizing signal to the converted analog image signal and a resulting signal is delivered to the monitor 30. The monitor 30 displays a received image.

The image decoder 33 of FIG. 10 decodes image coded data delivered out of the data separator 8 and delivers resulting data to the image display unit 28. A decoding scheme is the same type as the coding scheme in the image coder 32, including Huffman decoding and inverse DCT conversion.

A modulation signal of the modem 9 is modulated with a high frequency by means of the radio unit 24 and transmitted as an electric wave through the antenna 25. A receiving signal demodulated by the radio unit 24 is inputted to the modem 9 and demodulated into coded data.

The radio unit 24 of FIG. 10 has two high frequency modulator/demodulator means to permit total duplex communication on radio base.

When the confirmation button 262 on the operation panel 26 is depressed, the system controller 31 transfers switches 34 and 35 in order that an output of the image coder 32 can be inputted to the image decoder 33 to enable the monitor 30 to confirm an image picked up by the camera 29 of its own apparatus. When the confirmation button 262 is released, the switch 34 is transferred to the data synthesizer 7 and the switch 35 to the data separator 8.

In the voice/image simultaneous communication transceiver, exchange of communications is effected at two predetermined frequencies of first and second channels and an apparatus which carries out transmission through the first channel serves as a master party. The master party is precedently discriminated from a slave party by means of the setting switch 263.

When the communication button 261 is depressed, the system controller 31 checks the setting effected by the setting switch 263, so that a carrier is transmitted through the first channel in the case of the master party but through the second channel in the case of the slave party.

After radio connection has been completed in this manner, the training is carried out as in the first embodiment, the data transmission speed is determined and thereafter the transmission and reception of coded data resulting from the synthesis of voice coded data and image coded data is carried out. When the communication button 261 is depressed under this condition, the system controller 31 stops the generation of the carrier from the radio unit 24 and the communication ends.

In that case, if the system controller 31 recognizes that many data errors occur in the modem 9 during the voice/image simultaneous communication, the operation is again initiated beginning with transmission of an identification signal as in the phase of start of communication. Otherwise, if excellent exchange of communications can be obtained within a predetermined interval of time when the data transmission speed is not maximum, the operation like the communication start proceeds.

Since the radio unit 24 performs the transmission and reception of voice data and image data in this manner, a voice/image simultaneous communication transceiver can be provided which permits watching of an image while keeping talking.

According to the present invention, coded voice data and coded image data are synthesized and transmitted by using the high-speed modem capable of performing total duplex communication and therefore facsimile communication simultaneous with talking, which is difficult for the prior art based on, for example, frequency multiplexing to achieve, can be carried out. Further, by changing the transmission speed of image data in accordance with the condition of the circuit while keeping the transmission speed of voice data constant, the quality of voice can be kept to be constant.

Furthermore, by virtue of the provision of the radio unit, a radio communication apparatus can be provided which permits watching of an image while keeping talking.

We claim:

1. A voice/image simultaneous communication apparatus comprising:
   image input means for receiving an image to convert it into image data and delivering the image data;
   image coder means for compressively coding the image data delivered out of said image input means to convert it into image coded data and delivering the image coded data;
   voice input/output means for converting an inputted voice into an analog electric signal to deliver it and converting an inputted analog electric signal into a voice to deliver it;
   voice coder means for converting the analog electric signal delivered out of said voice input/output means into a digital signal and thereafter compressively coding the digital signal to convert it into voice coded data so as to deliver it;
   data synthesizer means for synthesizing the image coded data delivered out of said image coder means and the voice coded data delivered out of said voice coder means through a predetermined method and delivering synthesized coded data;
   data modem means for modulating the coded data delivered out of said data synthesizer means to deliver modulated data to a telephone line and demodulating coded data received from said telephone line to deliver demodulated data, said data modem means being capable of changing the data transmission speed during modem operation stepwise;

data separator means for separating the demodulated data delivered out of said data modem means into image coded data and voice coded data through a predetermined method and delivering them;

image decoder means for decoding the image coded data delivered out of said image decoder means into image data and delivering it;

image output means for receiving the image data delivered out of said image decoder means to convert it into an image and delivering the image;

voice decoder means for decoding the voice coded data delivered out of said data separator means to convert it into an analog electric signal and delivering the analog electric signal to said voice input-/output means;

circuit connecting means for connecting said data modem means and said telephone line; and system controller means for controlling the whole of a system, wherein before voice/image simultaneous communication is carried out, said system controller means controls said data modem means in accordance with information produced from said data modem means and used to decide the condition of said telephone line so as to change the data transmission speed in said data modem means and controls said data synthesizer means in accordance with the data transmission speed in said data modem means so as to change the ratio between the image coded data and the voice coded data which are to be synthesized by means of said data synthesizer means.

2. A voice/image simultaneous communication apparatus according to claim 1 wherein image storage means for temporarily storing the image coded data delivered from said data separator means to said image decoder means is interposed between said data separator means and said image decoder means.

3. A voice/image simultaneous communication apparatus according to claim 1 wherein image storage means for temporarily storing the image data delivered from said image decoder means to said image output means is interposed between said image decoder means and said image output means.

4. A voice/image simultaneous communication apparatus according to claim 1 wherein said image output means includes image display means for delivering the converted image by displaying it on the screen.

5. A voice/image simultaneous communication apparatus according to claim 1 wherein said image coder means performs an image coding processing of facsimile and said image decoder means performs an image decoding processing of facsimile.

6. A voice/image simultaneous communication apparatus according to claim 1 wherein said system controller means controls said data synthesizer means in accordance with the data transmission speed in said data modem means so as to fix the transmission speed of said voice coded data when the ratio between the image coded data and the voice coded data which are to be synthesized by means of said data synthesizer means is changed.

7. A voice/image simultaneous communication apparatus according to claim 1 wherein said data synthesizer means synthesizes the image coded data and the voice coded data by adding thereto discrimination flags that indicate which one of the image coded data and voice coded data the data to be synthesized is when synthesizing the image coded data and voice coded data, and said data separator separates the synthesized data into the image coded data and voice coded data in accordance with said discrimination flags added to said synthesized data.

8. A voice/image simultaneous communication apparatus according to claim 1 wherein said data synthesizer synthesizes the image coded data and the voice coded data on time division base and said data separator separates the synthesized coded data into the image coded data and voice coded data on time division base.

9. A voice/image simultaneous communication apparatus according to claim 1 further comprising talking detecting means for detecting that said voice input/output means, said voice coder means or said voice decoder means is in operation, and said system controller means controls said circuit connecting means such that connection between said data modem means and said telephone line is not disconnected when said image .coder means or said image decoder means is in operation even if said talking detecting means detects the ending of the operation.

10. A voice/image simultaneous communication apparatus according to claim 1 wherein radio communication means is provided in place of said circuit connecting means and said telephone line, and said radio communication means converts modulated coded data delivered out of said data modem means into a radio signal so as to transmit it and converts a received radio signal into modulated coded data so as to deliver it to said data modem means.

* * * * *